US008573790B2

(12) United States Patent
Hamamura et al.

(10) Patent No.: US 8,573,790 B2
(45) Date of Patent: Nov. 5, 2013

(54) LIGHT ABSORBING OPTICAL ELEMENT HAVING MICRO-RELIEF STRUCTURE

(75) Inventors: Yutaka Hamamura, Yokohama (JP); Kiyoshi Kadomatsu, Odawara (JP); Yasutoshi Takada, Kawasaki (JP); Yoshiro Tani, Mito (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/899,078

(22) Filed: Oct. 6, 2010

(65) Prior Publication Data

US 2011/0069393 A1  Mar. 24, 2011

Related U.S. Application Data

(63) Continuation of application No. PCT/JP2009/057134, filed on Apr. 7, 2009.

(30) Foreign Application Priority Data

Apr. 8, 2008 (JP) ................................ 2008-099843

(51) Int. Cl.
*G02B 27/00* (2006.01)

(52) U.S. Cl.
USPC ........................... 359/614; 359/601; 359/350

(58) Field of Classification Search
USPC ............. 359/614, 599; 216/24; 428/212, 323, 428/457, 458, 469, 470, 471, 472, 472.1, 428/472.2, 472.3, 473
See application file for complete search history.

(56) References Cited

U.S. PATENT DOCUMENTS

| 4,802,737 | A | * | 2/1989 | Denton ......................... 359/588 |
| 4,840,444 | A | * | 6/1989 | Hewitt .............................. 359/3 |
| 5,636,232 | A | * | 6/1997 | Goto ............................... 372/21 |
| 6,707,838 | B2 | | 3/2004 | Tani et al. |
| 7,659,007 | B2 | * | 2/2010 | Suzuki et al. .............. 428/542.2 |
| 7,667,895 | B2 | * | 2/2010 | Argoitia et al. ............... 359/576 |
| 2002/0002993 | A1 | * | 1/2002 | Maruyama et al. ........... 136/258 |
| 2007/0195417 | A1 | | 8/2007 | Yamamoto et al. |
| 2008/0057273 | A1 | | 3/2008 | Hamamura et al. |

FOREIGN PATENT DOCUMENTS

| CN | 1930497 A | 3/2007 | |
| DE | 102 22 852 A1 | 2/2003 | |
| EP | 1855127 A1 * | 11/2007 | ............ B42D 15/00 |
| JP | A-10-50674 | 2/1998 | |
| JP | A-2002-268120 | 9/2002 | |
| JP | A-2002-350613 | 12/2002 | |
| JP | A-2007-279084 | 10/2007 | |
| JP | A-2007-528021 | 10/2007 | |
| WO | WO 2005/088355 A1 | 9/2005 | |
| WO | WO 2006/046502 A1 | 5/2006 | |

OTHER PUBLICATIONS

International Search Report mailed on Jul. 7, 2009 issued in International Patent Application No. PCT/JP2009/057134 (with translation).
Written Opinion of the International Searching Authority mailed on Jul. 7, 2009 issued in International Patent Application No. PCT/JP2009/057134 (with translation).
Mar. 26, 2013 Office Action issued in Japanese Application No. 2010-507249 (with English translation).

* cited by examiner

*Primary Examiner* — Stephone Allen
*Assistant Examiner* — Tamara Y Washington
(74) *Attorney, Agent, or Firm* — Oliff & Berridge, PLC

(57) ABSTRACT

An optical element that includes a substrate having two surfaces, each of the surfaces having a micro-relief structure that includes numerous fine protrusions, and a film that includes one or more layers including a metal layer and that is formed on one of the micro-relief structures.

10 Claims, 11 Drawing Sheets

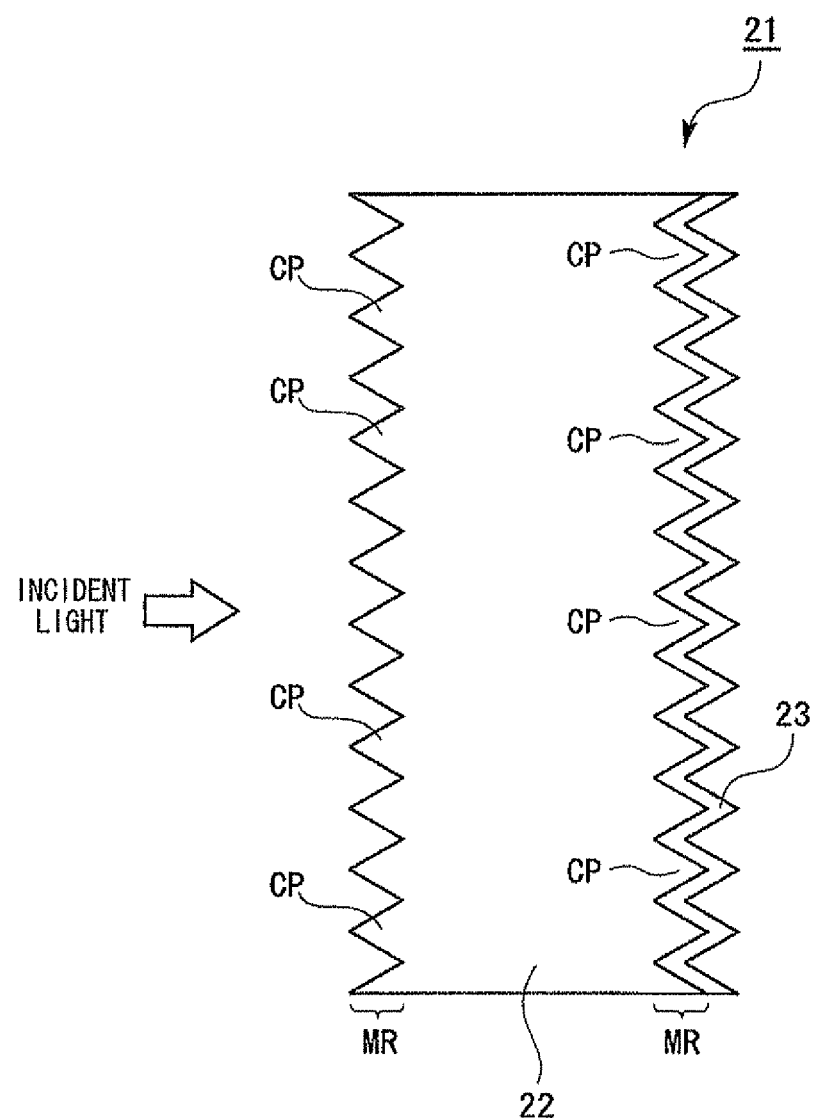

LIGHT ABSORBING OPTICAL ELEMENT HAVING MICRO-RELIEF STRUCTURE

CROSS-REFERENCE TO RELATED APPLICATION

This is a Continuation Application of International Application No. PCT/JP2009/057134 filed on Apr. 7, 2009 and published as WO 2009/125769, which claims priority to Japanese Patent Application No. 2008-099843 filed on Apr. 8, 2008. The contents of the aforementioned applications are incorporated herein by reference.

BACKGROUND

The present invention relates to an optical element at least a partial section of which has a light absorption property, a method of producing the same optical element, and an optical apparatus equipped with the optical element.

In an optical device such as light-source device, unwanted light out of use may generate stray light in the interior of the device and constitute a noise-component or the like. In the conventional optical device, generation of the stray light has been prevented by arrangement of optical elements having light absorption properties to absorb the unwanted light. Such elements previously known are constituted of members having a plate shape, a cone shape, or the like coated with a black coating.

As another example, black-coated plate having an optical aperture of circular or slit shape has been known as an optical element having light absorption property in at least a partial section. Such an optical element is used to constrict or shape a light flux (beam) to a circular shape, a slit shape or the like. Only to provide a beam-shaping function, a part of such an optical element may has a high reflectance except for a section where the light flux passes through. However, the light reflected from the part of high reflectance become stray light to constitute a noise component. Therefore, so as to prevent the generation of stray light, the reflectance is reduced by applying the black-coating at that part to provide light-absorption property.

An optical element provided recently has a micro-relief structure (micro-relief structure) constituted of numerous micro-protrusions (fine protrusions) formed on a surface of a silicon layer formed on a substrate such as a silica substrate (PCT International Publication for Patent Applications, WO2006/046502). This optical element is arranged such that the light is incident on the optical element from a side where the micro-relief structure is formed. According to this optical element, reflectance is reduced by the above-described micro-relief structure, thereby reducing reflection noise. Therefore, this optical element may be utilized, for example, as an optical mask that generates low reflection noise. In a method of producing an optical element disclosed in WO 2006/046502, a surface of a silicon layer is subjected to dry etching while depositing fine mask material on the surface of the silicon layer. As a result, a micro-relief structure constituted of randomly distributed numerous fine protrusions (micro-protrusions) is formed on the surface of the silicon layer.

Japanese Unexamined Patent Application, First Publication No. 2007-279084 discloses a source of laser light. There are various applications of laser light sources, for example, a light source of an exposure apparatus used in photolithography.

SUMMARY

In an optical apparatus such as laser light source, exposure apparatus, spectrometer or the like designed to use a light component of specific target wavelength, suppression of light components of unwanted wavelength is required. For example, the above-described Japanese Unexamined Patent Application, First Publication No. 2007-279084 describes a technique to convert fundamental wave of infrared region to short-wavelength ultraviolet light using a wavelength converter, and utilize the short-wavelength ultraviolet light in an exposure apparatus or the like. In this case, light component of unwanted wavelength is generated with wide wavelength range from infrared region to ultraviolet region.

The above-described optical element having a micro-relief structure formed on the surface of the silicon layer may be used satisfactorily since the optical element has reduced optical reflectance and reduces the reflection-noise.

However, while the above-described optical element having a micro-relief structure formed on the surface of the silicon layer provides satisfactory light absorption property in visible region and ultraviolet region, a sufficient light absorption property cannot be obtained in infrared region (for example, in a wavelength region ranging from 1 μm to 4 μm) due to reduction of an absorption coefficient of silicon for this wavelength range.

On the other hand, in an optical apparatus that utilizes short-wavelength ultraviolet light, specifically, vacuum ultraviolet light, at least a partial section of an optical system may be arranged in a casing where a substance such as oxygen that absorbs vacuum ultraviolet light is eliminated. Conventional black coating or the like cannot be used in this case since the coating may release evaporative substance (volatile substance) having light absorption property in ultraviolet region, and/or the evaporated substance may form a light absorbing contamination layer on a surface of the optical element through photochemical reaction caused by the ultraviolet light. Use of a maze-type optical trap may suppress light of unwanted wavelengths, but complicates and enlarges the constitution of the apparatus.

An object according to an aspect of the present invention is to provide an optical element at least a partial section of which having a high light absorption property in a wide wavelength range ranging from ultraviolet region to infrared region, a production method thereof, and an optical apparatus utilizing the optical element.

Another object according to an aspect of the present invention is to provide an optical element having a high light absorption property in the wide wavelength range, being free of problems of degassing or the like, and allowing arrangement of the optical element in a narrow space in an apparatus, method of producing the same optical element, and an optical apparatus utilizing the optical element.

An optical element according to a first aspect of the present invention includes a substrate having a micro-relief structure that includes numerous (a plurality of) fine protrusions and is formed on at least one surface of the substrate.

According to a second aspect of the present invention, an optical element according to the above-described first aspect may comprise: a substrate having two surfaces each having the micro-relief structure including numerous fine protrusions; and a film that includes one or more layers including a metal layer and is formed on the micro-relief structure formed on one of the surfaces of the substrate.

A method of producing an optical element according to a third aspect of the present invention includes forming a micro-relief structure on a surface of a substrate by performing dry etching of the surface of the substrate while depositing fine masking materials on the surface of the substrate.

According to a fourth aspect of the present invention, a method of producing an optical element according to the third aspect may further comprises forming a film including one or more layers including a metal layer such that the micro-relief structure formed on one surface of the substrate is covered by the film.

An optical apparatus according to a fifth aspect of the present invention includes a light-absorbing member (light absorbent member) made of the optical element according to the first or second aspect.

A light-source apparatus according to a sixth aspect of the present invention includes a wavelength converting optical system that generates output light including a component having a wavelength different from a wavelength of input light, a wavelength selective optical system that divides (splits) components (light-components) of output light each having different wavelength to different optical paths, wherein a light absorbing member made of the optical element of the second aspect is arranged in at least one of the divided optical path.

According to some aspects of the present invention, it is possible to provide a method of producing an optical element having high light absorbing property in a wavelength ranging from ultraviolet region to infrared region, a method of producing the same optical element, and an optical apparatus that utilizes the optical element.

BRIEF EXPLANATION OF DRAWINGS

FIG. 1 is a schematic cross sectional view showing an optical element according to an embodiment of the present invention.

FIG. 2A shows a primary stage in formation of micro-relief structure MR.

FIG. 2B shows an intermediate stage subsequent to the stage shown in FIG. 2A in the formation of the micro-relief structure MR.

FIG. 2C shows a final stage in the formation of the micro-relief structure MR,

FIG. 3A shows a stage where the micro-relief structure is formed on both surfaces of the substrate.

FIG. 3B shows a stage subsequent to the stage shown in FIG. 3A where a film is formed on one surface of the substrate.

DESCRIPTION

Figure 2A:
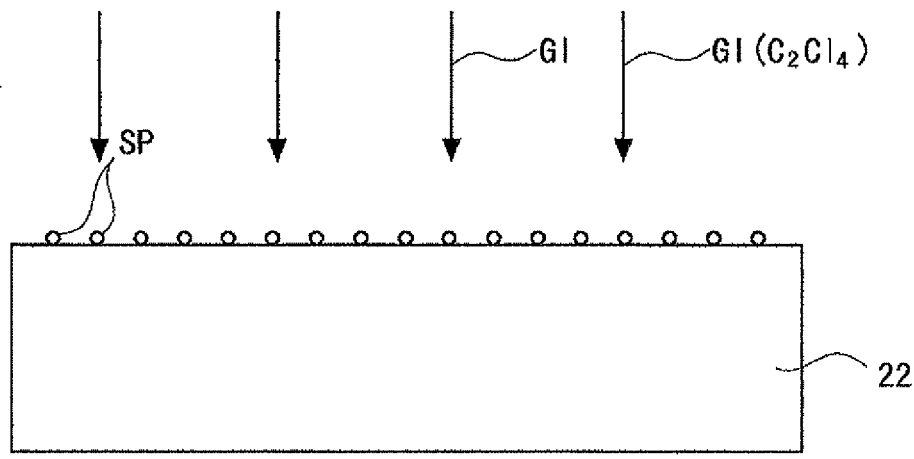
FIGS. 2A to 2C constitute a process diagram showing a method of producing an optical element shown in FIG. 1.

An optical element, production method thereof, and an optical apparatus according to some embodiments of the present invention are explained below.

Optical Element

According to an embodiment of the present invention, an optical element has a substrate having a micro-relief structure formed on at least one surface of the substrate, where the micro-relief structure includes numerous (a large number of) fine protrusions (micro-protrusions).

The micro-relief structure (uneven surface structure) may be formed on one surface of the substrate. Alternatively, the micro-relief structure may be formed on both surfaces (a first surface and a second surface) of the substrate. In the surface of the substrate on which the micro-relief structure is formed, the micro-relief structure may be formed on a partial area (partial region) or on the whole area.

The micro-relief structure may has a structure in which a plurality of protrusions are arranged on a surface of the substrate with a predetermined density. The length (height) of each protrusion may be controlled to be several nanometers to several thousand nanometers, for example, 50 nm to 100 nm, or 300 nm to 500 nm. Density (area density) of the protrusion may be $5\times10^6/cm^2$ to $1\times10^{10}/cm^2$.

Preferably, the above-described substrate is made of a material having large absorption coefficient with respect to light of wide wavelength range.

For example, semi-metals such as silicon (Si) or various resins may be used as the material of the substrate. The substrate including a semi-metal may be selected from silicon (Si), germanium, mixed crystal of silicon and germanium, and gallium-arsenide. For example, the substrate may be a silicon substrate.

The above-described resin denotes an organic polymer (macromolecule) material. For example, a resin selected from vinyl chloride, ABS resin, polycarbonate or the like may be used as the material of the substrate. The substrate may includes one species of resin, or two or more species of resin.

The above-described resin may include aromatic ring and/or unsaturated linkage. Since such a resin has a large absorption coefficient in the ultraviolet region, it is possible to constitute a substrate only of the resin. To achieve a still larger light absorption coefficient, it is preferable to have the resin contain light absorbing substance such as a carbon black. As an alternative to the carbon black, the light absorbing substance contained in the resin may be selected from materials, for example a commercial dye or an ultraviolet absorbing agent showing light absorption in wavelength range from visible region to ultraviolet region. For example, nigrosine-based black dye may be contained in the resin. Alternatively, at least one species of dye (black dye) selected from carbon black, aniline black, charcoal black, iron oxide$_{[a1]}$ or the like may be mixed in the resin.

Preferably, the material of the substrate used in the above-described embodiment may has an absorption coefficient of $1\times10^1$/cm or more, more preferably $1\times10^2$/cm or more, and more preferably $1.5\times10^2$/cm or more. Preferably, the above-described light absorption coefficient is satisfied in a wavelength range from 400 nm to 800 am. More preferably, in the ultraviolet region having a wavelength of shorter than 400 nm, the material of the substrate has light absorption coefficient as large as possible in the ultraviolet wavelength shorter than 400 nm to short wavelength region as short as possible.

The use of semi-metal substrate such as a silicon substrate is preferred because it is easy to form a micro-relief structure on the surface of the substrate. On the other hand, the resin substrate has an advantage in processability into various shapes since the resin has superior flexibility and/or plasticity compared to a semimetal.

The above-described optical element according to an embodiment of the present invention may has a substrate having the micro-relief structure formed on both surfaces (a first surface and a second surface) of the substrate, and a film formed on the micro-relief structure formed on one of the surfaces of the substrate, wherein the film may be constituted of one or more layers (sub-films) including a metal layer. The metal layer may be directly formed on the surface of the micro-relief structure on the surface of the substrate. The metal constituting the metal layer may be selected depending on the material of the substrate. For example, where a semimetal such as silicon is used in the substrate, it is preferable to use a metal selected from chromium (Cr), chromium based alloy, titanium (Ti), titanium based alloy or the like considering adhesion-ability to the substrate. For example, a film including a metal layer of chromium or titanium may be formed on a silicon substrate. A buffer layer may be formed on the micro-relief structure, and the metal layer may be formed on the buffer layer. Preferably, the buffer layer has adhesion-ability to the material of the substrate and the metal layer.

Thickness of the above-described film including at least one metal layer may be 0.1 μm to 5 μm, or may be 0.2 μm to 0.5 μm.

It is possible to provide an optical material having a high light absorption property in the wavelength range from ultraviolet region to visible region by using a substrate made of a material having a high light absorption property in the wavelength range from ultraviolet region to visible region, and forming the above-described micro-relief structure on at least one surface of the substrate. For example, it is possible to achieve a transmittance of 0.05% or less and a reflectance of 0.05% or less for the light in the wavelength range of 200 nm to 800 nm.

In the optical element according to an embodiment of the present invention, it is possible to exert high light absorption property in the wavelength range from ultraviolet region to infrared region by further forming the film including the metal layer on the substrate. For example, it is possible to achieve a transmittance of 0.05% or less and reflectance of 0.3% or less for the light of 200 nm to 1.5 μm in wavelength including infrared region. Further, it is possible to achieve a transmittance of 0.5% or less and reflectance of 0.3% or less for the light of 200 nm to 4 μm in wavelength.

In the above-described optical element, an opening (aperture) may be formed in the film at least containing one metal layer. In this case, it is possible to extract a light of infrared region through the opening.

The above-described optical element according to an embodiment of the present invention may exert a satisfactory light absorption property even where a total thickness of the element is 1 mm or less, for example, in the range from 0.2 mm to 0.6 mm. Therefore, the optical element may be disposed in a narrow space in an optical apparatus having a complicated configuration.

A shape of the above-described optical element is not limited. For example, it is possible to use a platy (sheet shaped) substrate having a shape of square plate, circular plate, or the like. Alternatively, after forming the micro-relief structure and the film including the metal layer on the platy substrate, the substrate may be shaped into a desired form.

Where necessary, the micro-relief structure may be formed on side surfaces of the substrate in addition to the front surface and/or the back surface of the substrate. Method of producing an optical element A method of producing an optical element according to an embodiment of the present invention includes forming a micro-relief structure on a surface of a substrate by performing dry etching of the surface of the substrate while depositing masking materials (fine masking materials) on at least one surface of the substrate.

A material of the substrate may be selected from the materials in the above-described explanation of the optical element.

The masking material denotes a material having a stronger resistance against dry etching than the resistance of a material of the substrate. For example, where the substrate is constituted of a semi-metal such as silicon, it is possible to use alumina ($Al_2O_3$), titanium oxide ($TiO_2$), silica ($SiO_2$) or a solid solution of two or more of these oxides as the masking material. Chromium oxide, iron oxide, magnesium oxide or the like may be solid-solubilized in the above-described oxide. The above-described oxide may also be used as a masking material on a resin substrate. Alternatively, for example, carbon or the like may be used as a masking material on the resin substrate.

As a method of dry etching the substrate, it is possible to use sputtering of a substrate, or a reactive ion etching of a substrate using a reactive gas ionized to plasma. Dry etching of the surface of the substrate while depositing masking materials on the substrate may be performed by subjecting the substrate and a material containing the masking material to reactive ion etching or sputter etching simultaneously, thereby performing etching of the substrate while depositing particles of the sputtered masking material on the surface of the substrate. For example, the substrate may be placed on the member containing the masking material, or may be placed on a side of the member containing the masking material so as to subject them to sputter etching. Alternatively, etching of the substrate using a reactive gas may be performed while sputtering a masking material by applying high frequency voltage to a target made of a member containing the masking material. The member containing the masking material may be made of the masking material.

The reactive gas may be selected depending on the material of the substrate. For example, it is possible to use an etching gas containing at least one of tetrachloromethane (CCl4), tetrachloroethylene, trichloroethylene, pentachloroethane, boron trichroride, and chroline, and assist gas such as oxygen, argon or the like added where necessary. Alternatively, the etching gas may be a mixed etching gas containing a chlorine based gas (chlorine-bearing gas) and fluorine-based gas (fluorine-bearing gas). The chlorine-based gas may contain at least one of tetrachloromethane, tetrachloroethylene, trichloroethylene, pentachloroethane, boron trichloride, and chlorine. The fluorine-based gas may contain at least one of tetrafluoromethane, trifluorometahne, hexafluoroethane, octafluoropropane, and fluorine. Where necessary, the mixed etching gas may contain assist gas such as oxygen and/or argon.

By performing dry etching of a surface of the substrate while depositing particles of masking material on the surface of the substrate according to the above-described method, it is possible to selectively etch portions not deposited with the masking material, thereby forming a micro-relief structure where fine protrusions are arranged at a high density.

To form the micro-relief structure on both surfaces of the substrate, it is possible to form the micro-relief structure on one surface (first surface) of the substrate, and subsequently form the micro-relief structure on the other surface (second surface) of the substrate. Alternatively, it is possible to form the micro-relief structure on both surfaces of the substrate by performing the deposition of the masking material and the sputtering simultaneously while rotating the substrate around an axis parallel to the surface of the substrate.

The method of producing a substrate according to an embodiment of the present invention may further comprise forming a film at least containing one metal layer so as to cover the micro-relief structure on one surface of the substrate by the film. The above-described film may be composed of one metal layer or of a plurality of metal layers. It is possible to form a buffer layer between the substrate and the metal layer to enhance the adhesion. The metal layer may be formed by general procedure such as vapor deposition. For example, the vapor deposition of the metal layer may be performed by resistant-heating or laser heating of metal. The metal layer may be formed by sputtering of a metal target or by bias-sputtering where high frequency bias is applied also to the substrate.

An optical element having the above-described constitution may be produced by the above-described method, Optical Apparatus An optical apparatus according to an embodiment of the present invention is an optical apparatus that includes a light-absorbing member constituted of an optical element according to the above-described present invention. Since the optical element according to an embodiment of the present invention exhibits high light-absorption properties in wide wavelength range, the optical element may be applied in various apparatus.

For example, an optical apparatus may have a constitution of a light source apparatus that has a wavelength converting system that generates an output light including a light component of wavelength different from that of the input light, and a wavelength selective optical system that separates (divides, splits) light components (lights) of different wavelengths included in the output light to respectively different optical paths, wherein a light-absorbing member made of an optical element according to an embodiment of the present invention is arranged in at least one of the separated optical paths.

Application of the optical element according to an embodiment of the present invention is not limited to a light source apparatus. For example, the optical element may be applied in an optical apparatus such as a spectrometer. The optical element according to an embodiment of the present invention may be used as a light absorbing member, in various optical apparatus (optical device) including cameras, binoculars, microscopes, telescopes or the like. Different from the conventional optical element coated with a black coating, contamination of the optical element or optical system due to degassing can be prevented or suppressed by using the optical element according to an embodiment of the present invention. Therefore, the optical element according to an embodiment of the present invention may be used as a light absorbing member in an optical apparatus that utilizes a light of vacuum ultraviolet region.

In the following, optical element, optical element production method, and an optical apparatus according to embodiments of the present invention are explained with reference to the drawings.

First Embodiment

FIG. 1 shows a vertical cross sectional view schematically showing an optical element 21 according to a first embodiment of the present invention. The optical element 21 according to the present embodiment is constituted as a light absorbing member in which the whole area of the plan view absorbs incident light.

The optical element 21 of the present embodiment includes a substrate 22 having a micro-relief structure MR formed on both surfaces of the substrate 22, and a film 23 composed of one or more layers including a metal layer. The micro-relief structure includes numerous fine protrusions CP. The film 23 is formed on the micro-relief structure formed on one surface (left side surface in FIG. 1) of the substrate 22.

As a material of the substrate 22, it is preferable to use a material having large absorption coefficient in wide wavelength range. Specifically, it is possible to use the above-described semi-metals such as silicon (Si) or resins as the substrate. The material of the substrate may be selected from the above-described materials explained with respect to the optical element. As explained above, dyes or pigments having light-absorbing properties may be included in the resin. Where a semi-metal such as silicon is used as the substrate, the micro-relief structure may be formed on the substrate conveniently.

While FIG. 1 shows the fine protrusions CP distributed regularly for a convenience in drawing the figure, heights or spacing of the protrusions may be distributed randomly in a practical embodiment.

The one or more layer of the film 23 formed on the surface of the micro-relief structure MR has at least one layer of metal. Material of the metal layer is not specifically limited because any metal has absorption properties to some extent with respect to the light of ultraviolet region to infrared region and reflectance to some extent at an interface with the micro-relief structure. Where the metal layer included in the film 23 is directly in contact with the fine protrusions CP (that is, a material of the substrate), it is preferable to select the material of the metal layer considering the adhesion-ability to the material of the substrate. For example, where silicon is used in the substrate, it is preferable to use chromium, chromium alloy, titanium, or titanium alloy in the metal layer. Preferably, the chromium alloy may contain 90% or more by mass of chromium, and the titanium alloy may contain 90% or more by mass of titanium. The film 23 may be constituted of a single metal layer, or of two or more metal layers 5 as shown by the film 3 in FIG. 3C. The film 23 may be a stacked film including one or more metal layers and one or more layers of different materials. For example, where the film 23 is constituted as a stacked film of a plurality of layers, the film 23 may be constituted of an outer metal layer 5 and an inner buffer layer 10 as shown by the film 3 in FIG. 3C.

While the micro-relief structure MR formed on both surfaces of the substrate is formed on the whole area in plan view of the substrate 22, and the film is formed on the whole area in plan view of the substrate 22 in the present embodiment, the formation region of the micro-relief structure on the both surfaces of the substrate and the formation region of the film may be restricted to a partial area of the substrate.

Next, an example of a method of producing an optical element 21 according to an embodiment of the present invention is explained with reference to FIG. 2A to FIG. 4. FIGS. 2A to 2C and FIGS. 3A, 3B are schematic cross sectional view showing the respective stages in the production the optical element 21. FIG. 4 shows a schematic configuration of a parallel-plate dry etching apparatus used in the respective stages shown in FIG. 2A to FIG. 2C and FIG. 3A.

Firstly, a substrate 22 is prepared. Next, the micro-relief structure MR is formed on a surface of the substrate by performing dry etching of the surface while depositing fine masking materials SP on the surface of the substrate (FIG. 2A to FIG. 2C), as explained in the following.

As shown in FIG. 4, the parallel plate dry etching apparatus 30 has a constitution principally similar to that of a reactive dry etching apparatus (RIE apparatus). The apparatus 30 has an anode electrode 31 grounded to the earth, and a cathode electrode 32 applied with high frequency electric power to make the reaction gas plasma, and a vacuum chamber 34 that houses these electrodes 31, 32. The cathode electrode 32 is connected to an AC voltage source 36 that generates predetermined high frequency voltage required in ionization of the reaction gas and formation of a micro-relief structure MR.

On the other hand, potential of the vacuum chamber 34 is set at the earth potential like as the anode electrode 31. The vacuum chamber 34 is maintained at an appropriate vacuum degree using a vacuum pump 38. Reaction gas is supplied to the vacuum chamber 34 from a reaction gas source 39. By introducing the necessary flow rate of the reaction gas into the vacuum chamber 34, it is possible to control the density of the reaction gas in the vacuum chamber 34 to a desired value. The reaction gas supplied from the reaction gas source 39 may be selected depending on a material of the substrate. For example, it is possible to use an etching gas containing at least one of tetrachloromethane ($CCl_4$), tetrachloroethylene, trichloroethylene, pentachloroethane, boron trichroride, and chroline. Where necessary, an assist gas such as oxygen, argon or the like may be added to the reaction gas. Alternatively, the etching gas may be a mixed etching gas containing a chlorine-based gas and a fluorine-based gas. The chlorine-based gas may contain at least one of tetrachloromethane, tetrachloroethylene, trichloroethylene, pentachloroethane, boron trichloride, and chlorine. The fluorine-based gas may contain at least one of tetrafluoromethane, trifluorometahne, hexafluoroethane, octafluoropropane, and fluorine. Where necessary, the mixed etching gas may contain an assist gas such as oxygen, argon or the like.

A disk shaped tray 41 made of alumina is placed on the cathode electrode 32, and the substrate 22 is disposed on the tray 41. The tray 41 functions as a support table supporting the substrate 22 and as a raw material of fine masking materials SP (fine mask of low etching rate) as described below. The substrate 22 has a simple platy shape before the treatment. An upper surface of the substrate 22 placed on the tray 41 is etched by incidence of ions which are ionized and accelerated between two electrodes 31, 32.

In a normal etching (etching without using masking materials), the substrate 22 is etched uniformly in a direction perpendicular to the upper surfaces of the electrodes 31, 32 with a predetermined anisotropy. However, in the present case, by sputter etching of the tray 41 supporting the substrate 22, sputtered particles SP ejected form the tray 41 made of alumina ($Al_2O_3$) are adhered randomly on the surface of the substrate 22. Since sputtering rate of silicon or the like forming the substrate 22 is larger than the sputtering rate of alumina where the reaction gas is composed of etching gas such as $CCl_4$ or the like, the sputtered particles SP randomly adhered to the surface of the substrate function as masking materials. As a result, protrusions CP are formed randomly throughout the surface of the substrate 22 due to the difference in etching rates between exposed portions (portions where masking materials are not adhered) and masked portions (portions where masking materials are adhered).

Figure 2B:
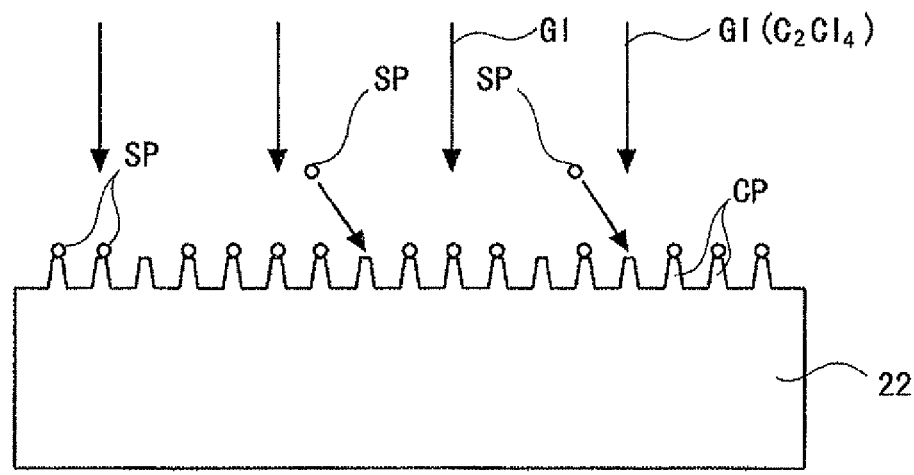
Figure 2C:
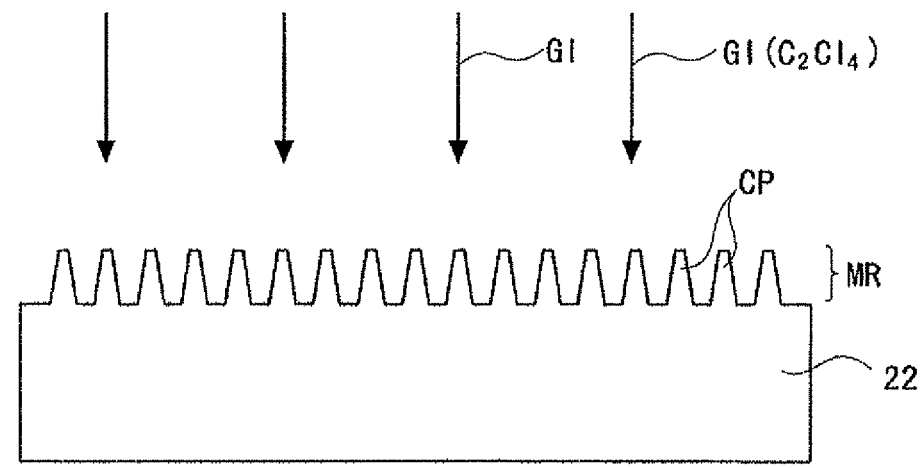

FIG. 2A, FIG. 2B, and FIG. 2C schematically show formation of micro-relief structure MR using the apparatus shown in FIG. 4. FIG. 2A shows a primary stage in the formation of the micro-relief structure MR. FIG. 2B shows an intermediate stage in the formation of the micro-relief structure MR. FIG. 2C shows a final stage in the formation of the micro-relief structure MR.

In the primary stage shown in FIG. 2A, since a surface of the tray is sputter-etched as well as the surface of the substrate 22, numerous sputtered-particles SP, that is, fine alumina particles ejected from the tray 41 reach the substrate 22 and are randomly adhered to the surface of the substrate 22.

In the intermediate stage shown in FIG. 2B, the sputtered particles SP adhered to the surface of the substrate 22 function as masks. Therefore, anisotropic etching by the reactive gas ions GI proceeds in the regions not-adhered with the sputtered-particles. As a result, numerous cone-shaped protrusions are formed in positions adhered with the sputtered-particles. Although their etching rates are smaller than the etching rate of the substrate 22, the sputtered particles SP adhered to the surface of the substrate are also etched by the ions GI. Therefore, tips of the protrusions CP are exposed gradually. However, other sputtered particles SP tend to be adhered to the tips of the protrusions CP. As a result, the protrusions CP grows gradually on the whole area.

In the final stage shown in FIG. 2C, the protrusions CP have grown to the size in the order of nanometer to the order of several micrometer, and the upper layer of the substrate 22 has a state where fine protrusions CP are formed randomly and densely. The upper layer portion thus formed with numerous fine protrusions CP constitutes the micro-relief structure MR.

Figure 3A:
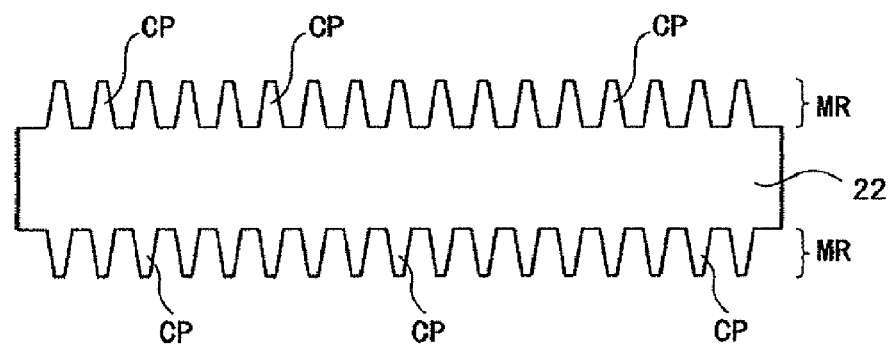
FIGS. 3A and 3B constitute a process diagram showing stages subsequent to the stage shown in FIG. 2C in formation of an optical element.
Figure 4:
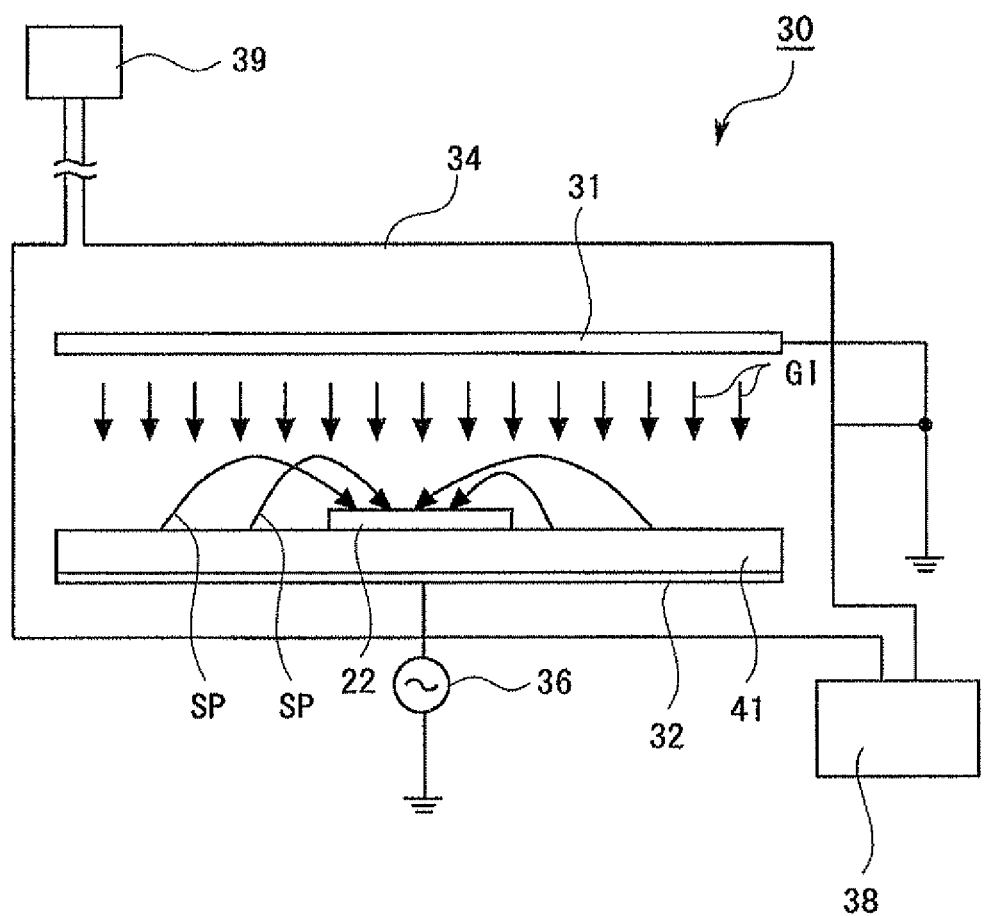
FIG. 4 is a schematic diagram schematically showing a parallel plate dry etching apparatus used in the method of producing an optical element shown in FIG. 1.

After the thus forming the micro-relief structure MR on one surface of the substrate 22, the micro-relief structure is formed on the other surface of the substrate 22 by performing dry etching of the other surface while depositing masking material on the other surface of the substrate 22 (FIG. 3A). Specifically, formation of the micro-relief structure may be performed using the parallel plate dry etching apparatus 30 shown in FIG. 4. After forming the micro-relief structure MR on one surface, the substrate 22 may be reversed and placed on a tray 41 and may be subjected to etching as described above.

Figure 3B:
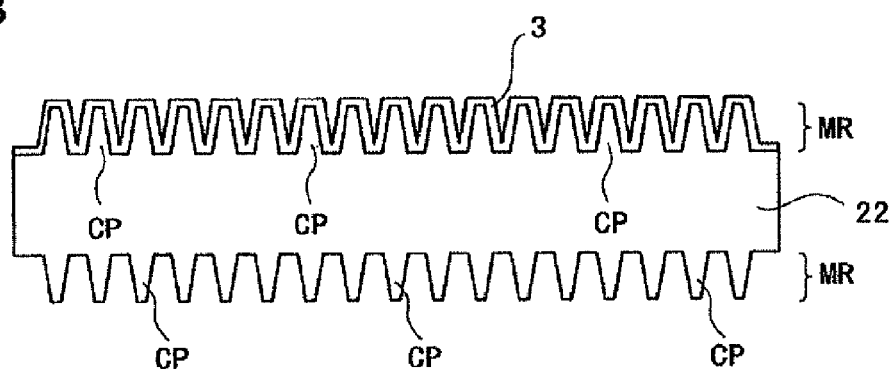
Figure 3C:
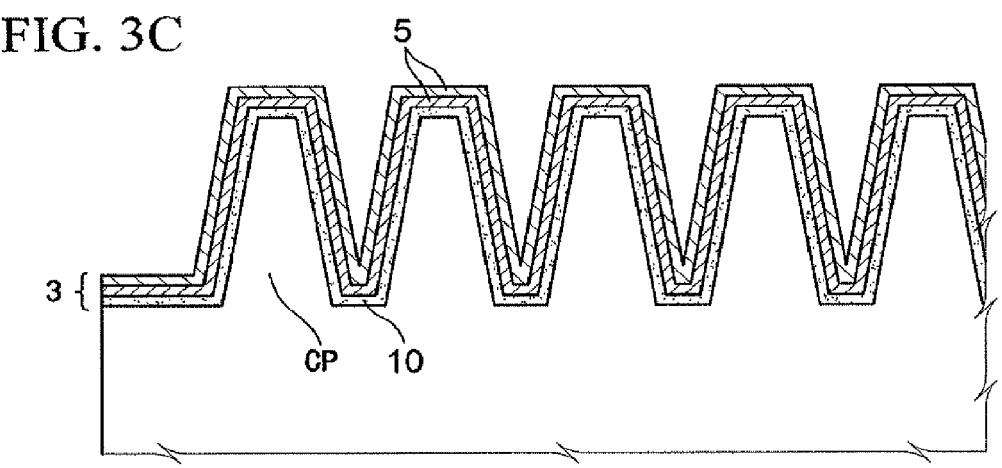
FIG. 3C shows an embodiment of an optical element at the stage shown in FIG. 3B where the film is composed of two or more metal layers and includes an outer metal layer and an inner buffer layer.

Finally, a film 3 is formed by vapor deposition or the like on the micro-relief structure MR formed on a surface of one side of the substrate 22 (FIG. 3B). Thus, formation of the optical element 21 according to the present embodiment is completed.

Figure 5:
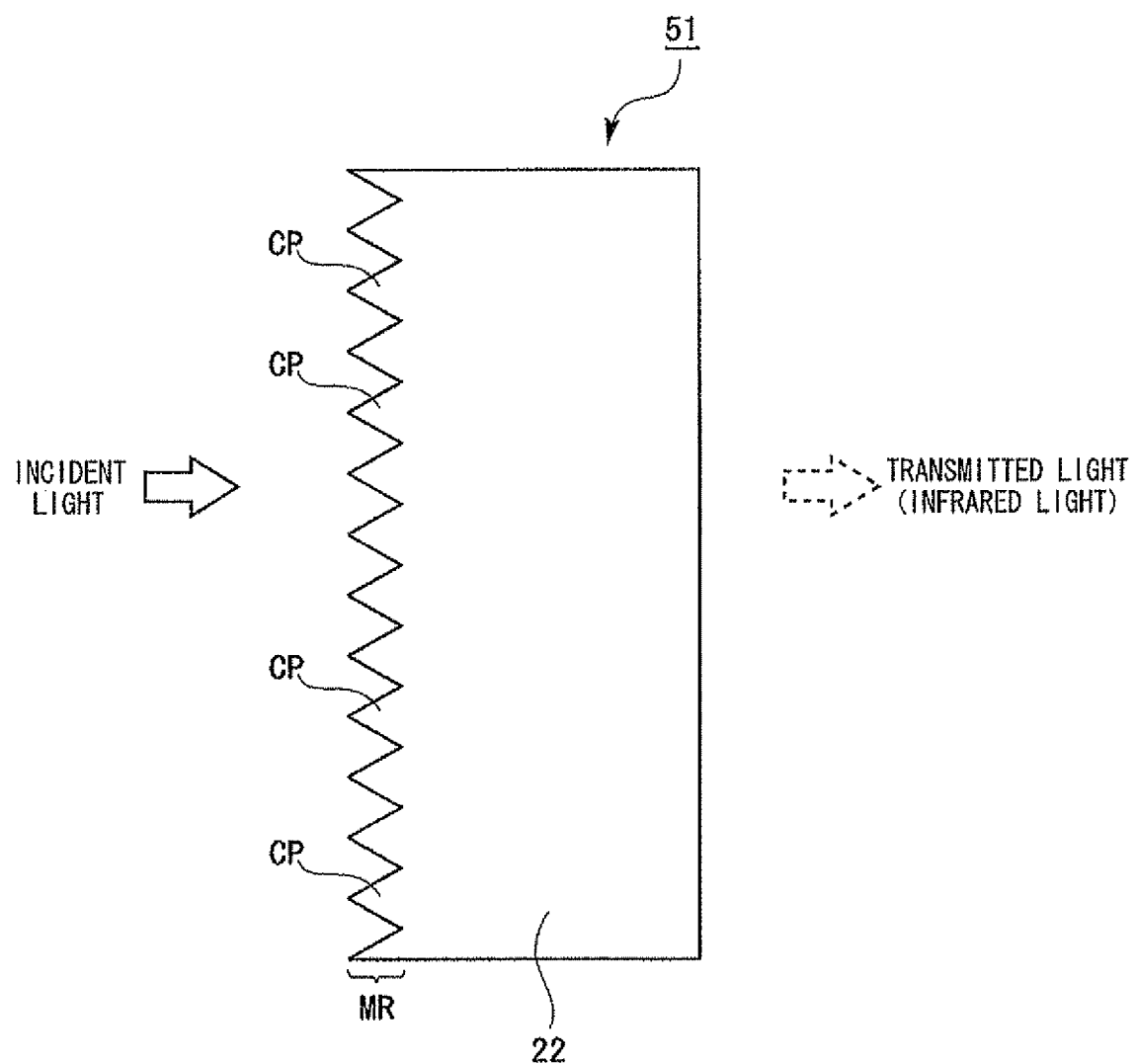
FIG. 5 is a schematic cross sectional view schematically showing an optical element according to a comparative embodiment.

As a comparative to the optical element 21 according to the present embodiment, an optical element of a comparative embodiment 51 is explained with reference to FIG. 5. FIG. 5 is a cross sectional view compared to FIG. 1 and schematically showing an optical element 51 according to an comparative embodiment. The optical element 51 of the comparative embodiment is different from the optical element 21 of the present embodiment in that the micro-relief structure MR is formed only on one surface of the substrate 22 and is not formed on the other surface, and the film is not formed. The optical element 51 of the comparative embodiment may be produced by the method explained above with respect to the production of the optical element 21 while the processing is terminated at the stage shown in FIG. 2.

In the optical element 21 according to the present embodiment, the surface (left side surface in the figure) having the micro-relief structure MR but lacks the film 3 is used as an incident surface of the light. In the optical element 51 according to the comparative embodiment, the surface (left side surface in the figure) having the micro-relief structure MR is used as an incident surface of the light. While the following explanation is described for a case where the substrate is made of silicon, the explanation may be applied for a case where the substrate is made of different materials such as a resin containing carbon black.

Both in the optical element 21 according to the present invention and the optical element 51 of the comparative embodiment, silicon has a satisfactory light-absorbing properties for a light in visible region and ultraviolet region. Therefore, when the light is incident on the micro-relief structure shown in the left side of the figure, the incident light 22 penetrates into the substrate 22 without returning to the incident side by the anti-reflection effect of the micro-relief structure on the incident surface. Then, the light of visible region to ultraviolet region is absorbed by the substrate 22. On the other hand, since silicon scarcely absorbs the light in infrared region, light component of infrared region included (for example, in the wavelength range of 1 μm to 4 μm) in the incident light is scarcely absorbed by the substrate 22 and propagates in the substrate 22, towards the left side shown in the figure.

In the optical element 51 of the comparative embodiment, the micro-relief structure MR and the film 3 are not formed on one surface (right side surface in the figure) of the substrate 22. Therefore, infrared component (light in infrared region) of incident light is scarcely absorbed and exits as a transmitted light to the right side from the substrate 22.

On the other hand, in the optical element 21 according to the present embodiment, micro-relief structure MR is formed on the surface shown as the right side surface in the figure, and the film 3 including a metal layer is formed on the right side micro-relief structure MR. Therefore, in the optical element 21 according to the present embodiment, components of the incident light that have escaped absorption by the substrate and reached the micro-relief structure propagates in the fine protrusion CP, be partially reflected by the metal layer of the film, and the residual components are partially injected to the metal layer and are absorbed by the metal layer.

At that time, since the metal layer has a relief shape (uneven shape) corresponding to the fine protrusions CP, light component reflected by the metal layer does not return to the incident side, propagates crossing the fine protrusions CP and is incident to the metal layer that faces the fine protrusions. Partial component of the light incident to the metal layer is absorbed, and partial component of the light is reflected again into the fine protrusions CP. Thus, the light which have reached the micro-relief structure propagates towards the tips of the fine-protrusion CP while repeating reflection and absorption in the region of the fine protrusions, gradually absorbed by the metal layer, and is finally extinguished.

Therefore, in the optical element 21 according to the present embodiment, infrared components of the incident light scarcely return to the incident side by reflection by the incident surface or the back surface of the optical element 21, and scarcely exit from the back side (right side in the figure) transmitting the optical element 21. Thus, a light absorption property is enhanced also for the light of infrared region.

As an optical element according to an example of the present invention, an optical element 21 according to the present embodiment was practically produced by the above-described production method. An optical element 51 according to a comparative example was practically produced by the above-described production method.

Specific production conditions were controlled as described below. In both of the optical element according to an example of the present invention and the optical element according to a comparative example, a silicon substrate having a diameter of 3 inches and a thickness of 0.38 mm was prepared as the substrate 22, and a micro-relief structure was formed on one surface of the silicon substrate using the parallel plate dry etching apparatus 30 shown in FIG. 4. At that time, using a tray made of alumina, the above-described dry etching was performed by applying high frequency RF power density of 0.07 w/cm$^2$ to the cathode electrode 32. During the etching, pressure in the vacuum chamber 34 was maintained to be 6 Pa while introducing $C_2Cl_4$ gas, $O_2$ gas, and $SF_6$ gas into the vacuum chamber 34 from the reaction gas source 39, where a flow rate of the $C_2Cl_4$ gas was 20 sccm, a flow rate of the $O_2$ gas was 10 sccm, and a flow rate of the $SF_6$ was 10 sccm. A duration of etching was 25 minutes. Fine protrusions CP of the thus formed micro-relief structure had needle shaped structure. According to the photograph taken by an electron microscope, the needle-shaped protrusions each had a length of about 2 μm. On of the silicon substrates having the thus formed micro-relief structure on one surface was applied as an optical element 51 according to a comparative example.

In the production of an optical element according to an example, the silicon substrate having the thus formed micro-relief structure on a first surface (one surface) was reversed and was placed on the tray 41. Then, a micro-relief structure was formed on the second surface (the other surface) of the substrate using the same conditions in the formation of the micro-relief structure MR on the first surface of the substrate. Further, a chromium layer of 0.3 μm in thickness was vapor deposited as a film 3 on the micro-relief structure on one surface (for example, on the first surface). Thus, an optical element according to an example of the present invention was produced.

Figure 6A:
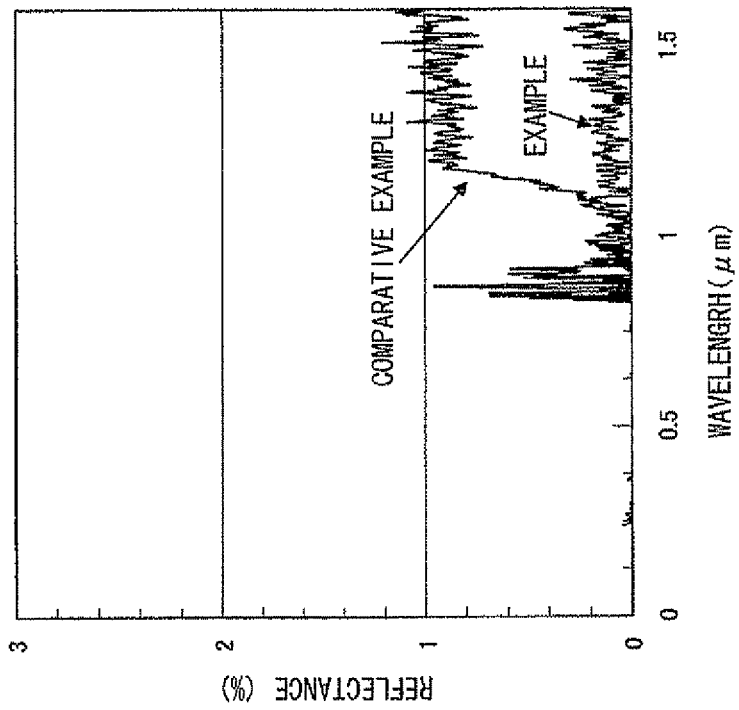
FIG. 6A is a graph showing optical properties of an optical element in an example of the present invention corresponding to the optical element shown in FIG. 1 and an optical element as shown in FIG. 5 according to a comparative example, where the optical properties are shown by wavelength dependent transmittance of light.
Figure 6B:
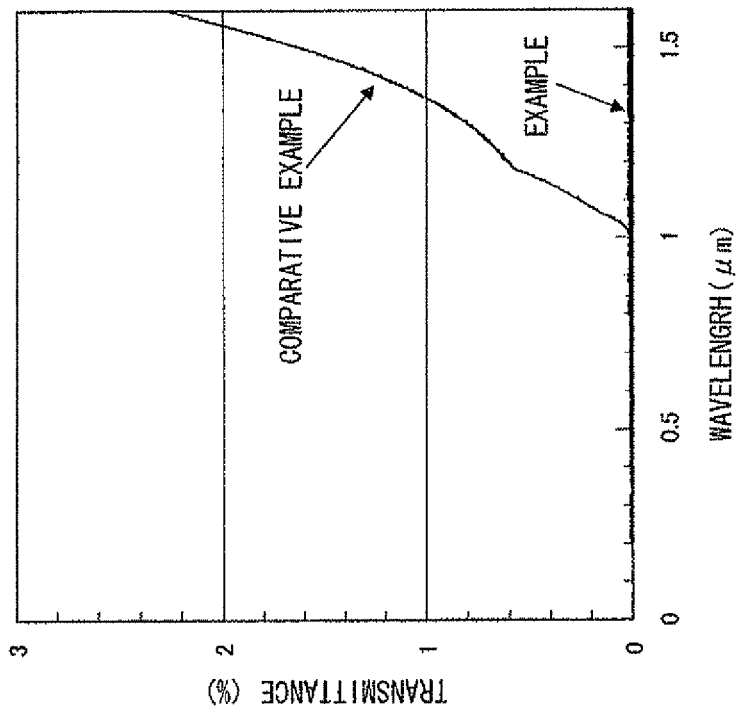
FIG. 6B is a graph showing optical properties of an optical element in an example of the present invention corresponding to the optical element shown in FIG. 1 and an optical element as shown in FIG. 5 according to a comparative example, where the optical properties are shown by wavelength dependent reflectance of light.
Figure 7A:
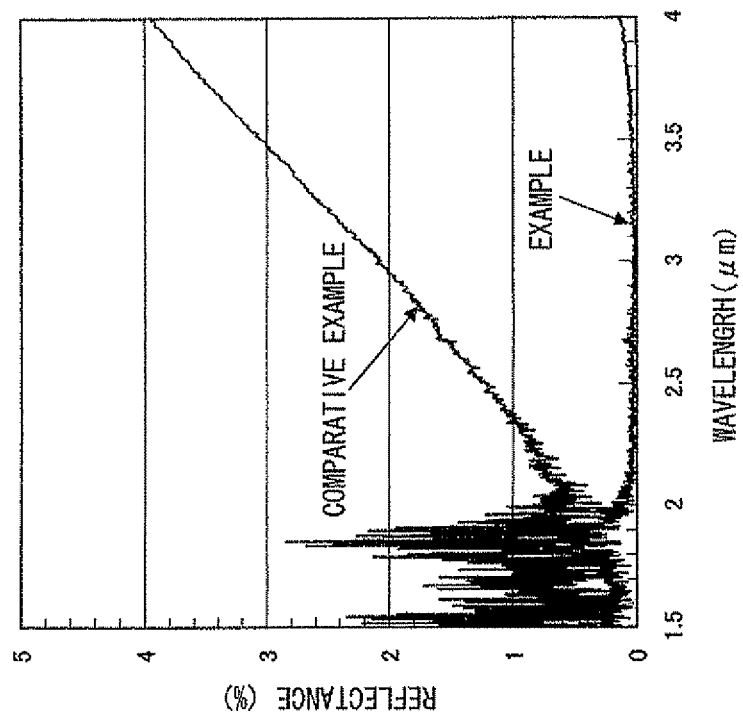
FIG. 7A is a graph showing wavelength dependent transmittance of light with respect to wavelength longer than the wavelength shown in FIG. 6A for an optical element in an example of the present invention corresponding to the optical element shown in FIG. 1 and an optical element as shown in FIG. 5 according to a comparative example.
Figure 7B:
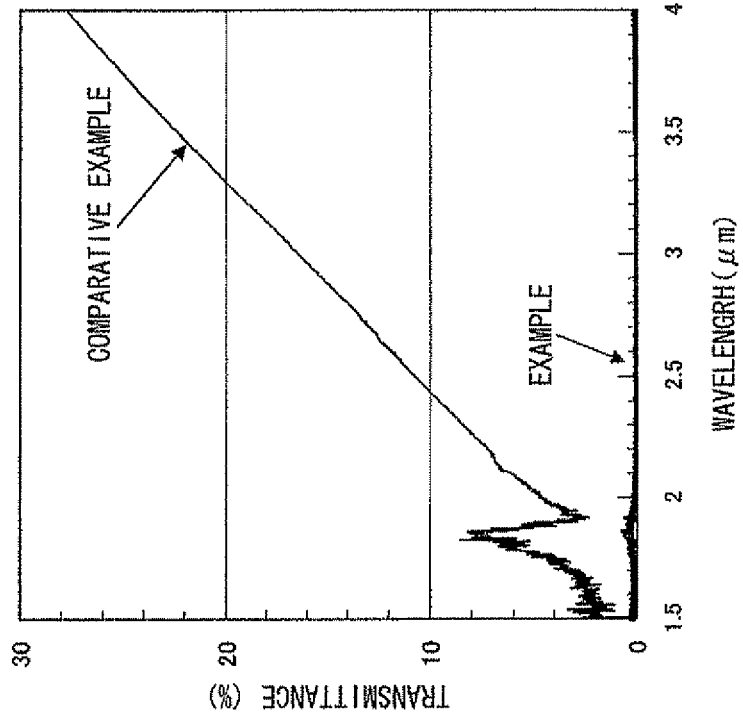
FIG. 7B is a graph showing wavelength dependent reflectance of light with respect to wavelength longer than the wavelength shown in FIG. 6A for an optical element in an example of the present invention corresponding to the optical element shown in FIG. 1 and an optical element as shown in FIG. 5 according to a comparative example.

Optical properties of the thus formed optical element according to the present example and the optical element 51 according to the comparative example were measured. The results of measurement are shown in FIGS. 6A, 6B and FIGS. 7A, 7B. FIG. 6A and FIG. 6B show results of measurement using an Ultraviolet-Visible Spectrophotometer CARY500 of Varian Inc. FIG. 7A and FIG. 7B show results of a measurement using a Fourier Transform Infrared Spectrometer FTIR-8300PC of Shimazu Corporation. FIG. 6A and FIG. 7A show a transmission spectrum, and FIG. 6B and FIG. 7B show a reflection spectrum.

As it can be seen in FIG. 6A and FIG. 6B, in the region of wavelength shorter than 1 μm, both of the example and the comparative example achieve high light absorption properties shown by very low transmittance and very low reflectance. Specifically both of transmittance and reflectance are 0.05% or less in the wavelength region of not longer than 800 nm. As it can be seen in FIG. 6A, FIG. 6B, FIG. 7A, and FIG. 7B, in the wavelength region not shorter than 1 μm, the present example has a very high light absorption property shown by very low transmittance and reflectance, while both of transmittance and reflectance were increased, that is, light absorption properties are deteriorated in the comparative example.

It should be noted that the length of the fine protrusions and the thickness of the film are not limited to the above-described values. For example, length of the fine protrusions may be in the range of 0.3 μm to 5 μm. A thickness of the film 23 may be in the range of 1 μm to 2 μm.

In the above-description, an optical element according to a first embodiment having micro-relief structure formed on both surface of the substrate, and a metal layer deposited on one surface of the substrate was described as an example, and an optical element having the micro-relief structure formed on only one surface of the substrate was described as a comparative example. However, the comparative example also shows a high light absorption property in visible region. Therefore, the optical element having a micro-relief structure only on one surface of the substrate may have high applicability when the optical element is used as a light absorbing member in a common optical apparatus such as a camera, a binocular or the like, in which generation of stray light in visible region causes particular problems.

Second Embodiment

Figure 8:
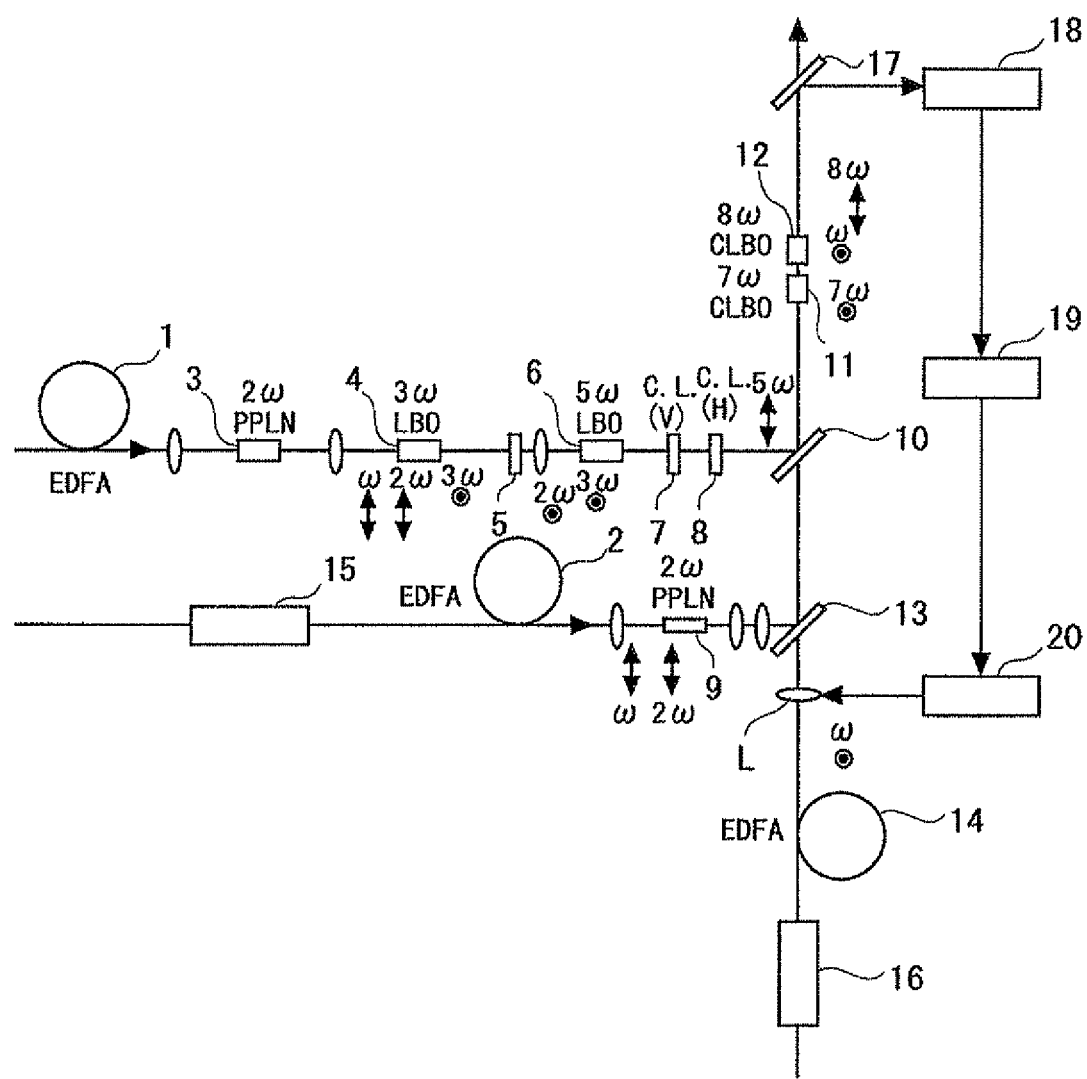
FIG. 8 is a schematic diagram of a wavelength converting system of a light source apparatus according to a second embodiment of the present invention.
Figure 9:
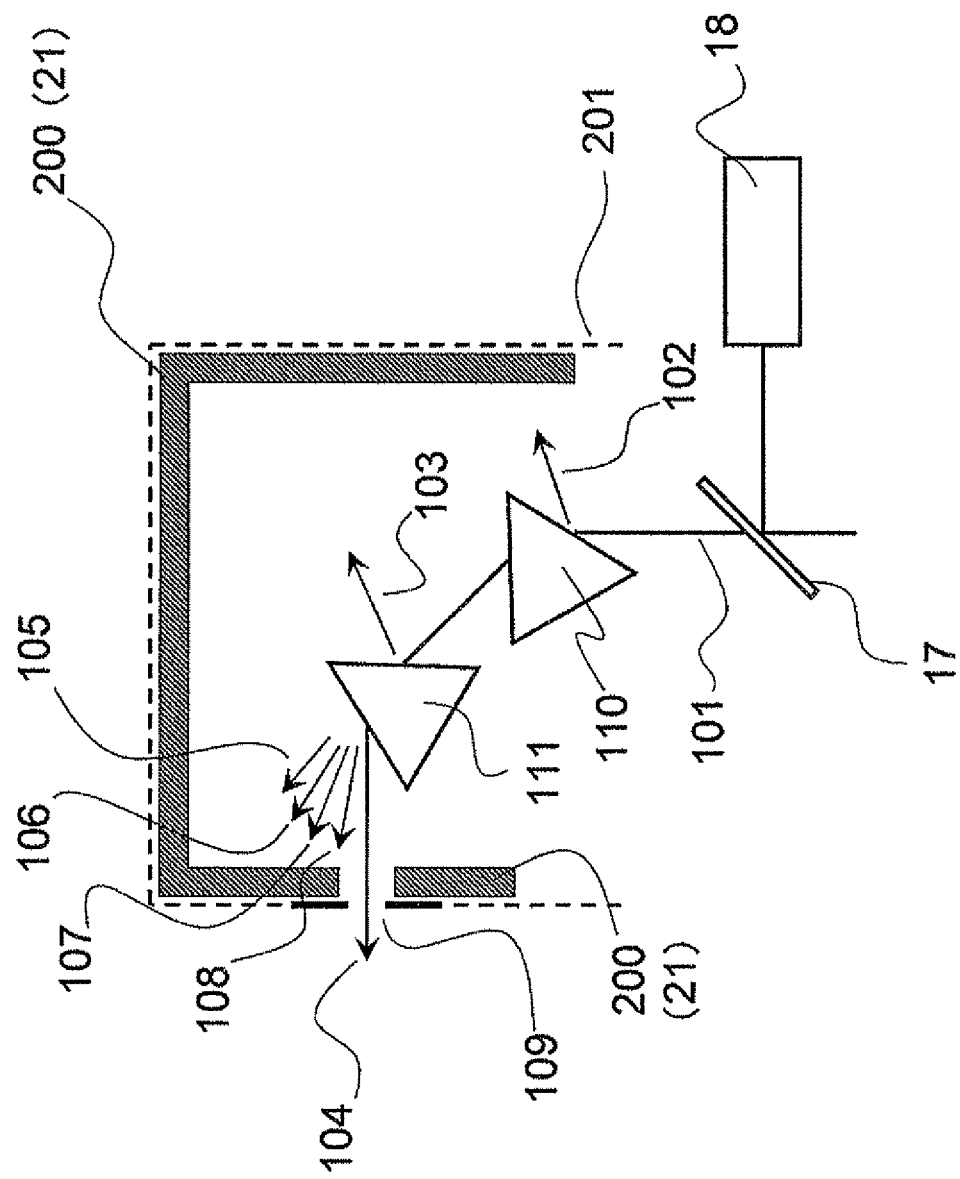
FIG. 9 is a schematic diagram of a wavelength selective optical system configured to extract only eighth harmonic wave of 193 nm in wavelength from the light generated in the wavelength selective optical system.

FIG. 8 and FIG. 9 show an optical apparatus according to a second embodiment of the present invention. The optical apparatus has an optical element 21 according to the above-described first embodiment as a light absorbing member 200 to absorb unwanted light. The optical apparatus of this embodiment is configured to be a sold-state laser light source that is equipped with a wavelength converting system and generates a light of 193 nm in wavelength.

FIG. 8 shows a schematic constitution of a wavelength converting system of the optical apparatus according to the present embodiment. The wavelength conversion process is briefly explained below.

Fundamental wave of 1547 nm in wavelength oscillated from a DFB (Distributed Bragg Reflection) laser as a laser light source (not shown) is amplified by a first EDFA (Erbium Doped Fiber Amplifier) 1, and is incident on a first second-harmonic generation element 3, and generates a second-harmonic wave of 773 nm in wavelength.

The generated second-harmonic wave and the fundamental wave are incident on third-harmonic generation element 4 and generates a third-harmonic wave of 516 nm in wavelength. The generated third-harmonic wave, fundamental wave, and the second harmonic wave are incident on a fifth-harmonic generation element 6 and generates a fifth-harmonic wave of 309 nm in wavelength.

On the other hand, a fundamental wave of 1547 nm in wavelength that has passed a first Delay device 15 and been incident to a second EDFA 2 is incident on a second second-harmonic generation element 9, where a second-harmonic wave is generated besides the fundamental wave. This second harmonic wave is synthesized by a dichroic mirror 13 with a fundamental wave of 1547 nm in wavelength which has passed a second Delay device 15 and been incident to a third EDFA 14. The dichroic mirror 13 is configured to transmit the fundamental wave and to reflect the second-harmonic wave. The fundamental wave and the second-harmonic wave synthesized by the dichroic mirror 13 are further synthesized with the above-described fifth-harmonic wave by a dichroic mirror 10. The dichroic mirror 10 is configured to transmit the fundamental wave and the second-harmonic wave and to reflect the fifth-harmonic wave.

The thus synthesized light composed of a fundamental wave, a second-harmonic wave, and a fifth-harmonic wave is incident on a seventh-harmonic wave generation element 11. The above-described light components and a seventh-harmonic wave of 211 nm in wavelength exits from the seventh-harmonic generation element 11 and are incident to a eighth-harmonic generation element 12, where a eighth-harmonic wave of 193 nm in wavelength is generated by synthesis of the fundamental wave and the seventh harmonic wave. The thus generated eighth-harmonic wave transmits a half-mirror 17 configured to split monitor light and exits from the half-mirror 17.

The eighth-harmonic wave exited from the eighth-harmonic wave generating element 12 is partially split by the half-mirror 17 and is incident on a monitoring device 18. The monitoring device has a position-sensitive element such as a two-dimensional CCD. Exit direction of the eighth-harmonic wave is calculated from the incident position of the light in the position-sensitive element, and is transferred to exit-light direction controlling device 19. The exit-light direction controlling device 19 sends a command to a lens-position controlling device 20 such that an exit direction of the eighth-harmonic wave coincident a predetermined direction, and changes the attitude of the lens L to control the incident direction of the fundamental wave that is incident on the eighth-harmonic generating element via the dichroic mirror 13, the dichroic mirror 10, and the seventh-harmonic wave generating element 11.

More detailed explanation of the wave-length converting system is described in Japanese Unexamined Patent Application, First Publication 2007-279084.

Due to the operation principle of the wavelength converting optical system of the above-described constitution, the light having a component of 193 nm in wavelength generated by the system inevitably includes components of a fundamental wave of 1547 nm in wavelength, its second-harmonic wave, fifth-harmonic wave, and seventh-harmonic wave. Therefore, where contamination of light of unwanted wavelength causes a problem, for example, in a light source of exposure apparatus used in photolithography, it is necessary to selectively isolate a light of target wavelength using a wavelength selective element such as a dichroic mirror, a prism, a grating or the like.

FIG. 9 shows a example of a constitution of a wavelength selective optical system in which prisms are used as a wavelength selective element to extract only the eighth-harmonic wave of 193 nm in wavelength from the light including components of fundamental wave to eighth harmonic wave generated by the wavelength converting optical system of FIG. 8.

In the wavelength selective system shown in FIG. 9, the light 101 including components of fundamental wave to eighth-harmonic wave which have exit from the above-described wavelength converting optical system is incident on prism 110 and 111. Fundamental wave 105, second-harmonic wave 106, fifth-harmonic wave 107, seventh-harmonic wave 108, and eighth-harmonic wave 104 are respectively split to different exit angle and exit from the prism 111. Only the eighth-harmonic wave is extracted outside the light source apparatus from an exit window 109 provided on an optical path corresponding to an exit angle of the eighth-harmonic wave 104.

In the wavelength selective system of FIG. 9, light absorbing member 200 that absorbs unwanted light composed of a fundamental wave 105 to a seventh-harmonic wave 108 is placed on an optical path of the fundamental wave 105 to the seventh-harmonic wave 108. In the present embodiment, an optical element 21 according to a first embodiment is used as the light absorbing member 200.

For example, as shown in FIG. 6A and FIG. 7A, the optical element 21 according to the above-described first embodiment show extremely low transmittance and reflectance for a light of wide-wavelength range from a wavelength of 1547 nm of the fundamental wave 105 to a wavelength of 211 nm of the seventh-harmonic wave 108. Since the optical element 21 shows very high light absorption properties, light components of fundamental wave 105 to seventh-harmonic wave 108 separated from the eighth-harmonic wave 104 by the prisms 110 and 111 are absorbed substantially perfectly by the light absorbing member 200 where the light absorbing member is constituted of the optical element 21 according to the first embodiment. As a result, only the eighth-harmonic wave 104 is extracted from the exit window 109. Where the pure eighth-harmonic wave 104 is used as an exposure light in an exposure apparatus, it is possible to obtain a satisfactory exposure resolution while avoiding chromatic aberration caused by the light components of different wavelength.

In the wavelength selective optical system shown in FIG. 9, the light absorbing member 200 is arranged in a wide region inside the enclosure (housing) 201, and reflection light 102 from an incident surface of the prism 110, and reflection light 103 from the incident surface of the prism 111 are also absorbed. Therefore, it is possible to suppress contamination to the eighth-harmonic wave 104 by stray light caused by repeated scattering and reflection of these lights.

Third Embodiment

Figure 10:
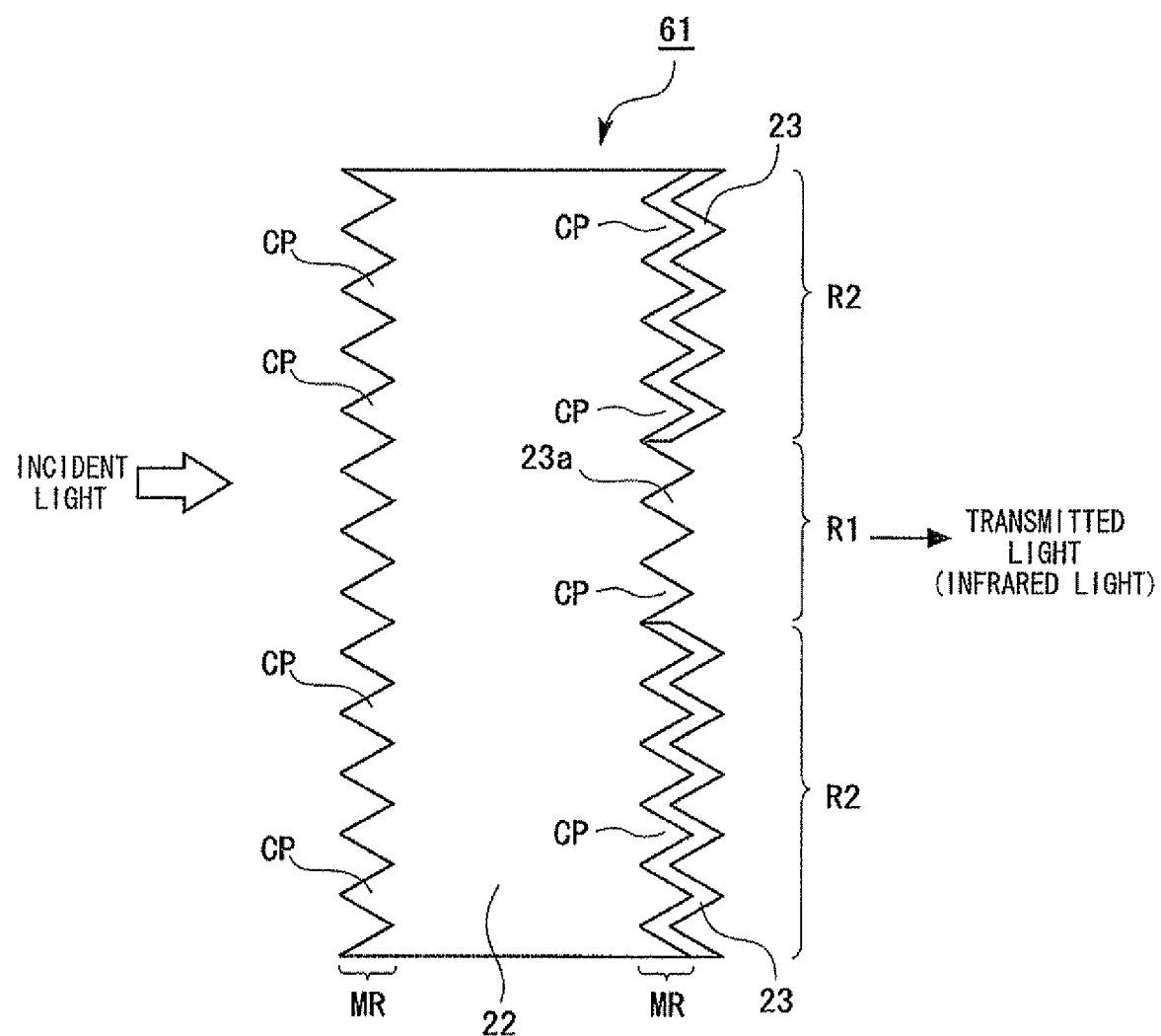
FIG. 10 is a cross sectional view schematically showing an optical element according to a third embodiment of the present invention.
Figure 11:
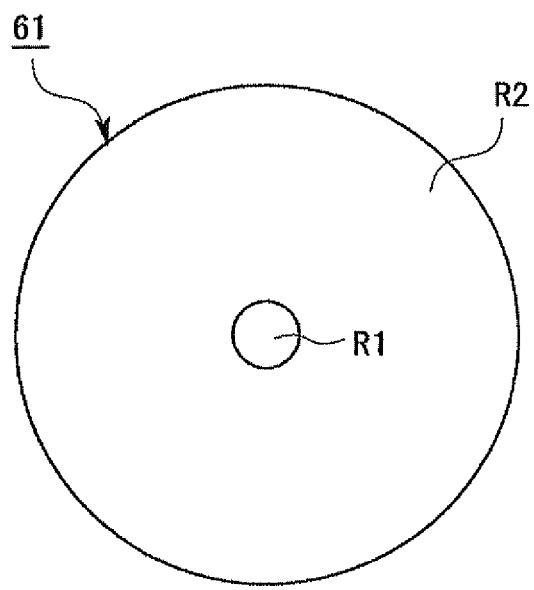
FIG. 11 is a schematic plan view showing respective regions of the optical element shown in FIG. 10.

FIG. 10 is a cross sectional view that corresponds to FIG. 1 and schematically shows an optical element 61 according to a third embodiment of the present invention. FIG. 11 is a schematic plan view showing each region R1, R2 of the optical element 61 shown in FIG. 1. Corresponding elements are indicated by the same symbols in FIG. 1 and FIG. 10 to omit a repeated explanation.

The optical element 61 according to the present embodiment is constituted to be an infrared aperture diaphragm as an infrared transmitting optical element.

The optical element 61 according to the present embodiment is different from the optical element 21 of the first embodiment in that the film 23 is not formed on the small-circle area R1 positioned in the central portion in plan view, but is only formed on a region R2 that surrounds the circle area R1 in the optical element 61 according to the present embodiment, while the film 23 is formed on the whole area in plan view of the optical element 21 according to the first embodiment. That is, an aperture section 23a corresponding to the area R1 is formed in the film 23 constituted of one or more layers formed on the micro-relief structure MR formed on one surface of the substrate 22.

In the optical element 61 according to the present embodiment 61, with respect to the light incident on the area R2, infrared components as well as visible to ultraviolet components of light is absorbed as in the above-described optical element 21 according to the first embodiment. On the other hand, with respect to the light incident on the area R1, visible components and ultraviolet components of the light absorbed, whereas infrared component of light is scarcely absorbed and exits outside the optical element 61 as transmission light. Therefore, the optical element 61 according to the present embodiment 61 may be used as an infrared aperture diaphragm. Since the region R2 has very low reflectance for infrared light due to antireflection effect of the micro-relief structure MR and absorption effect of the film, it is possible to largely reduce the reflection noise. The incident light may be composed only of infrared component, or may include visible and/or ultraviolet components in addition to the infrared components. In the latter case, the optical element 61 also functions as an infrared filter that selectively transmits infrared component of light.

For example, an optical element 61 according to the present embodiment may be produced by preparing an optical element 21 according to the above-described first embodiment, and forming the aperture section 23a by a photolithoetching method or the like.

In the present embodiment, it is possible to obtain a desired infrared transmitting optical element by varying a shape and arrangement of the aperture 23a. For example, where the aperture 23a is formed to have a slit shape, it is possible to obtain an infrared transmitting element configured to shape the infrared light flux to a slit shape. Alternatively, it is possible to obtain infrared mask by appropriately controlling the shape and arrangement of the aperture 23a.

While embodiments of the invention have been described and illustrated above, it should be understood that these are exemplary of the invention and are not to be considered as limiting. For example, the above-described optical element may be applied not only to the above-described exposure apparatus but also to various optical apparatus. Additions, omissions, substitutions, and other modifications can be made without departing from the scope of the present invention. Accordingly, the invention is not to be considered as being limited by the foregoing description, and is only limited by the scope of the appended claims.

An optical element according to an embodiment of the present invention may have high light absorption properties in wide wavelength range form the ultraviolet region to infrared region, and does not cause contamination of optical elements and optical device due to degassing, and therefore, applicable to various optical apparatus. In a method according to an embodiment of the present invention, the above-described optical element may be manufactured by a simple method. In an optical apparatus equipped with the above-described optical element, it is possible to reduce chromatic aberration and/or stray light due to light components of unwanted wavelength, thereby improving accuracy in apparatus performance such as optical measurement and exposure.

What is claimed is:

1. A light absorbing optical element, comprising:
a substrate having an absorption coefficient of $1 \times 10^1$/cm or more in a wavelength range from 400 nm to 800 nm, the substrate having an entrance face and a back face, each of the entrance face and the back face having a micro-relief structure that includes numerous fine protrusions; and
a film that includes one or more layers including a metal layer and is formed on the micro-relief structure of the back face,
wherein when a light enters into and passes through the substrate, the light exits from the micro-relief structure of the back face and then enters into the one or more layers including the metal layer and is absorbed by the metal layer.

2. The optical element according to claim 1, wherein the substrate comprises a semimetal or a resin.

3. The optical element according to claim 1, wherein the metal layer comprises chromium or titanium.

4. The optical element according to claim 1, wherein an aperture is formed in a partial area of the film including one or more layers.

5. An optical apparatus that comprises a light absorbing member that is made of the optical element according to claim 1.

6. A light source apparatus comprising:
 a wavelength converting system that generates an output light including a light component having a wavelength different from a wavelength of an input light; and
 a wavelength selective optical system that divides components of different wavelength included in the output light to different optical paths,
  wherein a light absorbing member made of the optical element according to claim 1 is arranged in at least one of the different optical paths.

7. The optical element according to claim 1, wherein the optical element has a transmittance of 0.05% or less in a wavelength range of 200 nm to 800 nm.

8. The optical element according to claim 1, wherein the film comprises a plurality of metal layers.

9. The optical element according to claim 1, wherein the film comprises an outer metal layer and an inner buffer layer.

10. The optical element according to claim 1, wherein the fine protrusions have a height of 50 nm-100 nm.

* * * * *